(12) United States Patent
Janssen et al.

(10) Patent No.: US 9,248,444 B2
(45) Date of Patent: Feb. 2, 2016

(54) PROCESS FOR REGENERATING A COKED CATALYTIC CRACKING CATALYST

(71) Applicant: SHELL OIL COMPANY, Houston, TX (US)

(72) Inventors: Andries Hendrik Janssen, Amsterdam (NL); Andries Quirin Maria Boon, Amsterdam (NL); John William Harris, Amsterdam (NL); Nicolaas Wilhelmus Joseph Way, Amsterdam (NL); Colin John Schaverien, Amsterdam (NL); Johan Willem Gosselink, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 14/563,479

(22) Filed: Dec. 8, 2014

(65) Prior Publication Data

US 2015/0094201 A1  Apr. 2, 2015

Related U.S. Application Data

(62) Division of application No. 13/453,835, filed on Apr. 23, 2012, now Pat. No. 8,927,794.

(30) Foreign Application Priority Data

Apr. 21, 2011 (EP) .................................... 11163462

(51) Int. Cl.
| | | |
|---|---|---|
| B01J 38/40 | (2006.01) | |
| B01J 29/90 | (2006.01) | |
| C07C 4/02 | (2006.01) | |
| B01J 38/14 | (2006.01) | |
| B01J 38/30 | (2006.01) | |
| C10B 49/22 | (2006.01) | |
| C10B 53/02 | (2006.01) | |
| C10G 1/08 | (2006.01) | |
| C10G 3/00 | (2006.01) | |
| C10G 11/18 | (2006.01) | |
| B01J 38/12 | (2006.01) | |

(52) U.S. Cl.
CPC B01J 38/40 (2013.01); B01J 29/90 (2013.01); B01J 38/12 (2013.01); B01J 38/14 (2013.01); B01J 38/30 (2013.01); C10B 49/22 (2013.01); C10B 53/02 (2013.01); C10G 1/08 (2013.01); C10G 1/083 (2013.01); C10G 3/57 (2013.01); C10G 11/18 (2013.01); C10G 2300/1011 (2013.01); C10G 2300/708 (2013.01); Y02E 50/14 (2013.01)

(58) Field of Classification Search
None
See application file for complete search history.

(56) References Cited

U.S. PATENT DOCUMENTS

| | | | |
|---|---|---|---|
| 3,502,574 A | 3/1970 | Baillie | |
| 4,435,279 A | 3/1984 | Busch et al. | |
| 4,851,109 A | 7/1989 | Chen et al. | |
| 4,876,108 A | 10/1989 | Underwood et al. | |
| 5,580,442 A | 12/1996 | Kwon et al. | |
| 6,652,815 B1 | 11/2003 | Sattar | |
| 7,369,294 B2 | 5/2008 | Gally et al. | |
| 8,003,835 B2 | 8/2011 | Yanik et al. | |
| 8,013,195 B2 | 9/2011 | McCall et al. | |
| 8,063,258 B2 | 11/2011 | Bartek et al. | |
| 8,207,385 B2 | 6/2012 | O'Connor et al. | |
| 8,288,599 B2 | 10/2012 | Yanik et al. | |
| 8,288,600 B2 | 10/2012 | Bartek et al. | |
| 8,455,705 B2 | 6/2013 | Cortright et al. | |
| 8,524,960 B2 | 9/2013 | O'Connor et al. | |
| 8,748,680 B2 | 6/2014 | Hogendoorn et al. | |
| 2008/0022595 A1 | 1/2008 | Lemaire et al. | |
| 2008/0035526 A1 | 2/2008 | Hedrick et al. | |
| 2008/0216655 A1 | 9/2008 | Vimalchand et al. | |
| 2009/0013603 A1 | 1/2009 | Rolland | |
| 2009/0026112 A1 | 1/2009 | Dierickx et al. | |
| 2009/0253948 A1 | 10/2009 | McCall et al. | |
| 2010/0105970 A1 | 4/2010 | Yanik et al. | |
| 2010/0135734 A1 | 6/2010 | Bryan, Jr. | |
| 2010/0163455 A1 | 7/2010 | Hadjigeorge et al. | |
| 2010/0222620 A1 | 9/2010 | O'Connor et al. | |
| 2011/0138681 A1 | 6/2011 | Ramirez Corredores et al. | |
| 2011/0154720 A1 | 6/2011 | Bartek et al. | |
| 2011/0224471 A1 | 9/2011 | Wormsbecher et al. | |
| 2012/0022307 A1 | 1/2012 | Yanik et al. | |
| 2012/0160741 A1 * | 6/2012 | Gong | C10G 1/002 208/113 |
| 2012/0198756 A1 | 8/2012 | O'Connor et al. | |

FOREIGN PATENT DOCUMENTS

| | | |
|---|---|---|
| CN | 1270984 | 10/2000 |
| CN | 101558135 | 10/2009 |
| CN | 101824330 | 9/2010 |
| EP | 231163 | 8/1987 |

(Continued)

OTHER PUBLICATIONS

Ancilotti, F. et al: "MTBE from Butadiene-rich C4s"; Hydrocarbon Processing; pp. 50-53; Dec. 1997.

(Continued)

*Primary Examiner* — Tam M Nguyen

(57) ABSTRACT

A process for regenerating a coked catalytic cracking catalyst which the carbon-containing deposits on the catalyst contains at least 1 wt % bio-carbon, based on the total weight of carbon present in the carbon-containing deposits is provided. Such coked catalytic cracking catalyst is contacted with an oxygen containing gas at a temperature of equal to or more than 550° C. in a regenerator to produce a regenerated catalytic cracking catalyst, heat and carbon dioxide.

6 Claims, No Drawings

(56) References Cited

FOREIGN PATENT DOCUMENTS

| | | |
|---|---|---|
| EP | 0649896 | 10/1994 |
| EP | 0994173 | 9/1999 |
| EP | 2053114 | 10/2007 |
| EP | 1903019 | 3/2008 |
| EP | 2108637 | 4/2008 |
| EP | 2107100 | 10/2009 |
| GB | 2166663 | 5/1986 |
| GB | 2447684 | 9/2008 |
| WO | 9321139 | 10/1993 |
| WO | 9426848 | 11/1994 |
| WO | 9500604 | 1/1995 |
| WO | 9718278 | 5/1997 |
| WO | 2007090884 | 8/2007 |
| WO | 2010002792 | 1/2010 |
| WO | 2010135734 | 11/2010 |

OTHER PUBLICATIONS

Corma, A. et al.; "Processing Biomass-Derived Osygenates in the Oil Refinery: Catalytic Cracking (FCC) Reaction Pathways and Role of Catalyst"; Journal of Catlysis, 2007, vol. 247; pp. 307-327.

Huber G.W., et al.; "Biorefineries-Synergies between Bio and Oil Refineries for the Production of Fuels from Biomass"; Angewandte Chemie International Edition, vol. 46, pp. 7184-7201; 2007.

Schoenmakers, J.L.M.M. et al.; "Comparison of Comprehensive Two-Dimensional Gas Chromatography and Gas Chromatography—Mass Spectrometry for the Characterization of Complex Hydrocarbon Mixtures", Journal of Chromatography—A, vol. 892; 18 pages; 2000.

Wilson, J.W.; Fluid Catalytic Cracking Technology and Operations; "Riser/Reactor Design and Operation"; Chapter 3; pp. 101-112; 1997.

Meier, W.M., et al.; "Atlas of Zeolite Structure Types"; Fourth Revised Edition; Zeolites; vol. 17; pp. 1-230; ISBN 0-444-10015-6; 1996.

Wilson, J.W., Fluid Catalytic Cracking Technology and Operations; Chapter 4; pp. 1131-1155; 1997.

Sadeghbeigi, R., "Fluid Catalytic Cracking Handbook: Design, Operation, and Troubleshooting of FCC Facilities", (1995) pp. 219-223.

Wilson, J.W., "Fluid Catalytic Cracking Technology and Operations", 1997, Chapter 8, pp. 223-235.

Lappas, A.A. et al; "Biomass Pyrolysis in a Circulating Fluid Bed Reactor for the Production of Fuels and Chemicals"; 2002, Fuel, vol. 81; pp. 2087-2095.

PCT International Search Report dated Jul. 25, 2012 for Ref. No. TS2623 PCT, Application No. PCT/EP2012/057414 filed Apr. 23, 2012.

Zhang et al: "Review of biomass pyrolysis oil properties and upgrading research", Energy Conversion and Management, Elsevier Science Publishers, Oxford, GB, vol. 48, No. 1, Jan. 1, 2007, pp. 87-92, XP005708901, ISSN: 0196-8904, SOI: 10.1016/J.ENCONMAN.2006.05.2010 *points 3 and 3.1; the whole document.

French R et al: "Catalytic pyrolysis of biomass for biofuels production", Fuel Processing Technology, Elsevier BV, NL, vol. 91, No. 1, Jan. 1, 2010, pp. 25-32, XP026780102, ISSN: 0378-3820, DOI: 10.1016/J.FUPROC.2009.08.011 [Retrieved on Sep. 5, 2009] *abstract; figures 1,3.

Kyung-Hae Lee et al: "Influence of Reaction Temperature, Pretreatment, and a Char Removal System on the Production of Bio-oil from Rice Straw by Fast Pyrolysis, Using a Fluidized Bed", Energy & Fuels, vol. 19, No. 5, Sep. 1, 2005, pp. 2179-2184, XP055013487, ISSN: 0887-0624, DOI: 10.1021/ef050015o—the whole document.

Fogassy, et al.: "Biomass derived feedstock co-processing with vacuum gas oil for second-generation fuel production in FCC units"; Appllied Catalysis B: Environmental; vol. 96; pp. 476-485; 2010.

Magee, J. S. et al ., "Fluid Catalytic Cracking", Science & Technology, 1993, pp. 391.

\* cited by examiner

PROCESS FOR REGENERATING A COKED CATALYTIC CRACKING CATALYST

This application is a divisional application of U.S. patent application Ser. No. 13/453,835, filed Apr. 23, 2012, now U.S. Pat. No. 8,927,794 which claims the benefit of European Patent Application No. 11163462.2, filed Apr. 21, 2011 the entire disclosure of which is hereby incorporated by reference.

FIELD OF THE INVENTION

The invention relates to processes for regenerating a coked catalytic cracking catalyst and catalytic cracking processes wherein a coked catalytic cracking catalyst is regenerated.

BACKGROUND TO THE INVENTION

The processing of petroleum oils in refineries is one of the major sources of industrial greenhouse gas emissions. One of the main industrial greenhouse gases is carbon dioxide. Under the Kyoto protocol, the emission of greenhouse gases such as carbon dioxide ($CO_2$) has been capped for developed countries. As a consequence many of these developed countries have in turn capped, or have made plans to cap in the future, the emission of greenhouse gases such as carbon dioxide by industry in their country. This has created a lively discussion how to reduce fossil $CO_2$ emission.

It is known that carbon is present in the atmosphere as $CO_2$ and that photoautotrophs like plants, algae and some bacteria fix this inorganic carbon to organic carbon (carbohydrates) using sunlight for energy. Over geological time frames ($>10^6$ years) organic matter (plant materials) is fossilized to provide petroleum, natural gas and coal. When consuming these fossil resources to make polymers, chemicals & fuel the carbon is released back into the atmosphere as $CO_2$ in a short time frame of 1-10 years. The rate at which biomass is converted to fossil resources is in total imbalance with the rate at which fossil resources are consumed and liberated. However, when using annually renewable crops or biomass as the feedstocks for manufacturing our carbon based polymers, chemicals and fuels, the rate at which $CO_2$ is fixed equals the rate at which it is consumed and liberated. Using annually renewable carbon feedstocks allows for sustainable development of carbon based polymer materials and control and even reduction of $CO_2$ emissions to help meet global $CO_2$ emissions standards under the Kyoto protocol.

It would be an advancement in the art to provide processes that may help to create sustainable $CO_2$ emissions or even reduce $CO_2$ emissions from a refinery and/or to provide processes that can be beneficial in a $CO_2$ capture and trade scheme.

WO2010/135734 describes a method for catalytically cracking a biomass feedstock and a refinery feedstock in a refinery unit having a fluidized reactor. The refinery unit may include a fluidized reactor; a first system providing a biomass feedstock and a refinery feedstock to the fluidized reactor and a second system for at least one of refreshing and regenerating a catalyst for the fluidized reactor. In one of the embodiments of WO2010/135734 the biomass feedstock comprises a plurality of solid biomass particles having an average size between 50 and 1000 microns. WO2010/135734 does not provide any details on the catalyst to be regenerated and the regeneration process. In addition WO2010/135734 does not describe how to improve sustainable $CO_2$ emissions or reduce fossil $CO_2$ emissions from the regenerator.

SUMMARY OF THE INVENTION

Accordingly, in one embodiment provides a process for regenerating a coked catalytic cracking catalyst, comprising contacting the coked catalytic cracking catalyst with an oxygen containing gas at a temperature of equal to or more than 550° C. in a regenerator to produce a regenerated catalytic cracking catalyst, heat and carbon dioxide, wherein the coked catalytic cracking catalyst comprises carbon-containing deposits, which carbon-containing deposits comprise at least 1 wt % bio-carbon, based on the total weight of carbon present in the carbon-containing deposits.

The above process may form part of a catalytic cracking process.

Hence, in another embodiment provides a catalytic cracking process comprising
(a) contacting a biomass material, and optionally a fluid hydrocarbon feed, with a catalytic cracking catalyst at a temperature of more than 400° C. in a catalytic cracking reactor to produce at least one cracked product and a coked catalytic cracking catalyst;
(b) contacting the coked catalytic cracking catalyst with an oxygen containing gas in a regenerator to produce a regenerated catalytic cracking catalyst, heat and $CO_2$.

In a further embodiment provides a catalytic cracking process comprising
(a) contacting a biomass material, and optionally a fluid hydrocarbon feed, with a catalytic cracking catalyst at a temperature of more than 400° C. in a catalytic cracking reactor to produce at least one cracked product and a coked catalytic cracking catalyst;
(b) contacting the coked catalytic cracking catalyst with an oxygen containing gas in a regenerator to produce a regenerated catalytic cracking catalyst, heat and $CO_2$; wherein the total feed of the biomass material and any optional fluid hydrocarbon feed has a bio-carbon weight percentage B1, based on the total weight of carbon in the total feed, and the coked catalytic cracking catalyst comprises carbon-containing deposits having a bio-carbon weight percentage B2, based on the total weight of carbon in the carbon-containing deposits; and the bio-carbon weight percentage B2 is higher than the bio-carbon weight percentage B1.

The processes advantageously allows part of the fossil $CO_2$ produced in the regenerator of a catalytic cracking unit to be replaced by sustainable or so-called "green" $CO_2$, thereby reducing the total emission of fossil $CO_2$ produced in a refinery, as explained above.

In addition, the bio-carbon on the coked catalytic cracking catalyst is a source for generating sustainable or "green" heat in the regenerator. This "green" heat can be used to make pressurized steam, for example high pressure steam and/or medium pressure steam. Thereby further reducing the total emission of fossil $CO_2$ from the refinery.

Further in an embodiment provides a coked catalytic cracking catalyst comprising carbon-containing deposits, which carbon-containing deposits comprise at least 1 wt % bio-carbon, based on the total weight of carbon present in the carbon-containing deposits.

DETAILED DESCRIPTION OF THE INVENTION

It has been found that in a refinery, a regenerator in a catalytic cracking unit (CCU), that is used to combust coke from coked catalytic cracking catalyst, is one of the major contributors to the emission of $CO_2$ by a refinery. A well known example of such a CCU is a fluidized catalytic cracking unit (FCCU). It has further been found that the emission of the $CO_2$ by a regenerator in a catalytic cracking unit (CCU) or fluidized catalytic cracking unit (FCCU) can be made more sustainable by increasing the bio-carbon content in the coke to be combusted, thereby reducing the percentage emission of fossil $CO_2$. In addition, total emissions may be reduced.

By processes for reducing fossil $CO_2$ emission is herein preferably understood processes that reduce the total weight of fossil $CO_2$ emissions from a refinery or refinery unit. As explained herein below, the present invention preferably reduces the total weight of fossil $CO_2$ emission by replacing at least part of fossil $CO_2$ emission by emission of $CO_2$ derived from a biomass material.

By fossil $CO_2$ is herein understood $CO_2$ derived from petroleum, natural gas or coal. Such fossil $CO_2$ also includes, for example, $CO_2$ indirectly derived from petroleum, natural gas or coal, such as $CO_2$ derived from synthetic (Fisher-Tropsch)crudes and/or tar-sands.

By a coked catalytic cracking catalyst is herein understood a catalytic cracking catalyst comprising carbon-containing deposits. The carbon-containing deposits on the catalytic cracking catalyst are sometimes also referred to as coke.

The carbon-containing deposits can be deposited on the catalytic cracking catalyst during a catalytic cracking process. Suitable catalytic cracking processes will be explained in more detail below.

The coked catalytic cracking catalyst comprises carbon-containing deposits, which carbon-containing deposits comprise at least 1 wt % bio-carbon, based on the total weight of carbon present in the carbon-containing deposits.

Preferably the coked catalytic cracking catalyst comprises equal to or more than 0.5 wt % of carbon-containing deposits, more preferably equal to or more than 1.5 wt % carbon-containing deposits, even more preferably equal to or more than 2.5 wt % carbon-containing deposits, based on the total weight of coked catalytic cracking catalyst. For practical purposes the coked catalytic cracking catalyst preferably comprises equal to or less than 30 wt % carbon-containing deposits, more preferably equal to or less than 10 wt % carbon-containing deposits, still more preferably equal to or less than 5 wt % carbon-containing deposits, based on the total weight of coked catalytic cracking catalyst.

The carbon-containing deposits contain carbon atoms and can in addition contain other elements such as for example hydrogen, sulfur and/or nitrogen. Preferably the carbon-containing deposits contain equal to or more than 90 wt % carbon, more preferably equal to or more than 91 wt % carbon, and still more preferably equal to or more than 94 wt % carbon and preferably equal to or less than 100 wt % carbon, more preferably equal to or less than 98 wt % carbon, based on the total weight of carbon-containing deposits.

For practical purposes the carbon content in the carbon-containing deposits can be determined with a LECO analyzer TGA 701 for determining moisture, volatile matter, ash and fixed carbon in coke. Fixed carbon is a calculated value of the difference between 100 and the sum of the moisture, ash and volatile matter, where all values are on the same moisture reference base.

In addition, the carbon-containing deposits may contain equal to or more than 2 wt % elemental hydrogen, more preferably equal to or more than 6 wt % elemental hydrogen and preferably equal to or less than 10 wt % elemental hydrogen, more preferably equal to or less than 8 wt % elemental hydrogen, based on the total weight of carbon-containing deposits.

Preferably the coked catalytic cracking catalyst comprises equal to or more than 5 wt %, more preferably equal to or more than 6 wt %, even more preferably equal to or more than 10 wt %, still even more preferably equal to or more than 15 wt % of bio-carbon and preferably equal to or less than 100 wt %, more preferably equal to or less than 90 wt % and most preferably equal to or less than 80 wt % of bio-carbon, based on the total weight of carbon present in the carbon-containing deposits.

When the coked catalytic cracking catalyst is produced in a catalytic cracking process wherein a, preferably solid, biomass material is used in the feed in combination with a fluid hydrocarbon feed, the coked catalytic cracking catalyst for practical purposes preferably comprises equal to or less than 25 wt % bio-carbon, based on the total weight of carbon present in the carbon-containing deposits.

For the purpose of this invention bio-carbon is understood to mean biobased carbon as determined according to ASTM test D6866-10 titled "Standard Test Methods for Determining the Biobased Content of Solid, Liquid and Gaseous samples using Radiocarbon Analysis", method B.

Further carbon or elemental carbon refer to carbon-atoms.

In another embodiment the coked catalytic cracking catalyst preferably comprises equal to or more than 0.000000000001 wt %, more preferably equal to or more than 0.00000000001 wt % of Carbon-14 isotope, based on the total weight of carbon atoms comprised in the carbon-containing deposits on catalyst.

The coked catalytic cracking catalyst can be produced by contacting a biomass material, optionally in the presence of a fluid hydrocarbon feed, with a catalytic cracking catalyst, preferably at a temperature of more than 400° C., in a catalytic cracking reactor.

By a biomass material is herein understood a material obtained from a renewable source. By a renewable source is herein understood a composition of matter of biological origin as opposed to a composition of matter obtained or derived from petroleum, natural gas or coal. Without wishing to be bound by any kind of theory it is believed that such material obtained from a renewable source may preferably contain carbon-14 isotope in an abundance of about 0.0000000001 %, based on total moles of carbon.

Preferably the renewable source is a composition of matter of cellulosic or lignocellulosic origin.

Any biomass material may be used in the process of the invention. Examples of suitable biomass materials include triglycerides, pyrolysis oils, liquefied biomass, solid biomass material and/or mixtures thereof. Examples of suitable triglyceride containing biomass materials include vegetable oils and animal fat. Examples of suitable vegetable oils include palm oil, rapeseed oil, coconut oil, corn oil, soya oil, safflower oil, sunflower oil, linseed oil, olive oil and peanut oil. Examples of suitable animal fats include pork lard, beef fat, mutton fat and chicken fat.

Preferably, however, the biomass material is a solid biomass material. An advantage of using a solid biomass material as a biomass material is that it may allow one to simplify processes, as for example operation units for liquefaction of a biomass are not needed. More preferably the solid biomass material is not a material used for food production. Examples of preferred solid biomass materials include aquatic plants and algae, agricultural waste and/or forestry waste and/or paper waste and/or plant material obtained from domestic waste.

Preferably the solid biomass material contains cellulose and/or lignocellulose. Examples of suitable cellulose- and/or lignocellulose-containing materials include agricultural wastes such as corn stover, soybean stover, corn cobs, rice straw, rice hulls, oat hulls, corn fibre, cereal straws such as wheat, barley, rye and oat straw; grasses; forestry products and/or forestry residues such as wood and wood-related materials such as sawdust; waste paper; sugar processing residues such as bagasse and beet pulp; or mixtures thereof. More preferably the solid biomass material is selected from the group consisting of wood, sawdust, straw, grass, bagasse, corn stover and/or mixtures thereof.

Such solid biomass materials are advantageous as they do not compete with food production and are therefore considered more sustainable. In addition, without wishing to be bound by any kind of theory, it is believed that feeding of solid biomass materials into a catalytic cracking reactor results in increased coking of the catalytic cracking catalyst with biocarbon. It is believed that cellulosic or lignocellulosic solid biomass materials have a higher elemental ratio of carbon to hydrogen than triglyceride materials, such as vegetable oils and/or animal fats, and that such higher elemental ratio of carbon to hydrogen leads to increased coking of the catalytic cracking catalyst.

The increased coking of the catalytic cracking catalyst when using solid biomass material as a feed is advantageous in at least two ways. First the increased coking causes an increased removal of carbon from the biomass material in the feed allowing for a better hydrogen to carbon ratio in the feed. Second the increased coking generates an increased amount of sustainable or "green" heat in the regenerator, thereby increasing the proportion of sustainable $CO_2$ versus fossil $CO_2$.

In a preferred embodiment the, preferably solid, biomass material, has an effective molar ratio of hydrogen to carbon ($H/C_{eff}$) in the range from equal to or more than 0 to equal to or less than 0.5. By the effective molar ratio of hydrogen to carbon ($H/C_{eff}$) is understood the molar ratio of hydrogen to carbon after the theoretical removal of all moles of oxygen, via water production with hydrogen originally present, presuming no nitrogen or sulphur present ($H/C_{eff}=(H-2*O)/C$).

For practical purposes the effective molar ratio of hydrogen to carbon ($H/C_{eff}$) can be measured as described in the article titled "Biorefineries—Synergies between Bio- and Oil Refineries for the Production of Fuels from Biomass", by G. W. Huber and A. Corma, published in Angewandte Chemie International Edition, 2007, volume 46, pages 7184-7201. and/or the article titled "Processing biomass-derived oxygenates in the oil refinery: Catalytic cracking (FCC) reaction pathways and role of catalyst", by Avelino Corma and George W. Huber, published in the Journal of Catalysis, 2007, volume 247, pages 307-327.

Any solid biomass material may have undergone drying, torrefaction, steam explosion, particle size reduction, densification and/or pelletization before being contacted with the catalyst, to allow for improved process operability and economics.

Preferably any solid biomass material is a torrefied solid biomass material. The torrefied solid biomass material can be produced by torrefying the solid biomass material at a temperature of more than 200° C.

By torrefying or torrefaction is herein understood the treatment of the solid biomass material at a temperature in the range from equal to or more than 200° C. to equal to or less than 350° C. in the essential absence of a catalyst and in an oxygen-poor, preferably an oxygen-free, atmosphere. By an oxygen-poor atmosphere is understood an atmosphere containing equal to or less than 15 vol. % oxygen, preferably equal to or less than 10 vol. % oxygen and more preferably equal to or less than 5 vol. % oxygen. By an oxygen-free atmosphere is understood that the torrefaction is carried out in the essential absence of oxygen.

Torrefying of the solid biomass material is preferably carried out at a temperature of more than 200° C., more preferably at a temperature equal to or more than 210° C., still more preferably at a temperature equal to or more than 220° C., yet more preferably at a temperature equal to or more than 230° C. In addition torrefying of the solid biomass material is preferably carried out at a temperature less than 350° C., more preferably at a temperature equal to or less than 330° C., still more preferably at a temperature equal to or less than 310° C., yet more preferably at a temperature equal to or less than 300° C.

Torrefaction of the solid biomass material is preferably carried out in the essential absence of oxygen. More preferably the torrefaction is carried under an inert atmosphere, containing for example inert gases such as nitrogen, carbon dioxide and/or steam; and/or under a reducing atmosphere in the presence of a reducing gas such as hydrogen, gaseous hydrocarbons such as methane and ethane or carbon monoxide.

The torrefying step may be carried out at a wide range of pressures. Preferably, however, the torrefying step is carried out at atmospheric pressure (about 1 bar, corresponding to about 0.1 MegaPascal). In addition, the torrefying step may be carried out batchwise or continuously.

The torrefied solid biomass material has a higher energy density, a higher mass density and greater flowability, making it easier to transport, pelletize and/or store. Being more brittle, it can be easier reduced into smaller particles.

Preferably the torrefied solid biomass material has an oxygen content in the range from equal to or more than 10 wt %, more preferably equal to or more than 20 wt % and most preferably equal to or more than 30 wt % oxygen, to equal to or less than 60 wt %, more preferably equal to or less than 50 wt %, based on total weight of dry matter (i.e. water-free matter).

Preferably any solid biomass material is a micronized solid biomass material. By a micronized solid biomass material is herein understood a solid biomass material that has a particle size distribution with a mean particle size in the range from equal to or more than 5 micrometer to equal to or less than 5000 micrometer, as measured with a laser scattering particle size distribution analyzer. In a preferred embodiment the micronized solid biomass material is produced by reducing the particle size of the solid biomass material, optionally before or after such solid biomass material is torrefied. Such a particle size reduction may for example be especially advantageous when the solid biomass material comprises wood or torrefied wood. The particle size of the, optionally torrefied, solid biomass material can be reduced in any manner known to the skilled person to be suitable for this purpose. Suitable methods for particle size reduction include crushing, grinding and/or milling. The particle size reduction may preferably be achieved by means of a ball mill, hammer mill, (knife) shredder, chipper, knife grid, or cutter.

Preferably the solid biomass material has a particle size distribution where the mean particle size lies in the range from equal to or more than 5 micrometer (micron), more preferably equal to or more than 10 micrometer, even more preferably equal to or more than 20 micrometer, and most preferably equal to or more than 100 micrometer to equal to or less than 5000 micrometer, more preferably equal to or less than 1000 micrometer and most preferably equal to or less than 500 micrometer.

Most preferably the solid biomass material has a particle size distribution where the mean particle size is equal to or more than 100 micrometer to avoid blocking of pipelines and/or nozzles. Most preferably the solid biomass material has a particle size distribution where the mean particle size is equal to or less than 3000 micrometer to allow easy injection into the riser reactor.

For practical purposes the particle size distribution and mean particle size of the solid biomass material can be determined with a Laser Scattering Particle Size Distribution Analyzer, preferably a Horiba LA950, according to the ISO 13320 method titled "Particle size analysis—Laser diffraction methods".

In addition to the, preferably solid, biomass material preferably also a fluid hydrocarbon feed may be contacted with the catalytic cracking catalyst in the catalytic cracking reactor.

By a hydrocarbon feed is herein understood a feed that contains one or more hydrocarbon compounds. By hydrocarbon compounds are herein understood compounds that contain both hydrogen and carbon and preferably consist of hydrogen and carbon. By a fluid hydrocarbon feed is herein understood a hydrocarbon feed that is not in a solid state. The fluid hydrocarbon co-feed is preferably a liquid hydrocarbon co-feed, a gaseous hydrocarbon co-feed, or a mixture thereof. The fluid hydrocarbon co-feed can be fed to a catalytic cracking reactor in an essentially liquid state, in an essentially gaseous state or in a partially liquid-partially gaseous state. When entering the catalytic cracking reactor in an essentially or partially liquid state, the fluid hydrocarbon co-feed preferably vaporizes upon entry and preferably is contacted in the gaseous state with the catalytic cracking catalyst and/or the solid biomass material.

The fluid hydrocarbon feed can be any non-solid hydrocarbon feed known to the skilled person to be suitable as a feed for a catalytic cracking unit. The fluid hydrocarbon feed can for example be obtained from a conventional crude oil (also sometimes referred to as a petroleum oil or mineral oil), an unconventional crude oil (that is, oil produced or extracted using techniques other than the traditional oil well method) or a Fisher Tropsch oil and/or a mixture thereof.

When the biomass material is a solid biomass material, the fluid hydrocarbon feed may also be a fluid hydrocarbon feed from a renewable source, such as for example a pyrolysis oil, a vegetable oil, liquefied biomass and/or mixtures thereof.

In one embodiment the fluid hydrocarbon feed is derived from a, preferably conventional, crude oil. Examples of conventional crude oils include West Texas Intermediate crude oil, Brent crude oil, Dubai-Oman crude oil, Arabian Light crude oil, Midway Sunset crude oil or Tapis crude oil.

More preferably the fluid hydrocarbon feed comprises a fraction of a, preferably conventional, crude oil or renewable oil. Preferred fluid hydrocarbon feeds include straight run (atmospheric) gas oils, flashed distillate, vacuum gas oils (VGO), coker gas oils, diesel, gasoline, kerosene, naphtha, liquefied petroleum gases, atmospheric residue ("long residue") and vacuum residue ("short residue") and/or mixtures thereof. Most preferably the fluid hydrocarbon feed comprises a long residue, a vacuum gas oil and/or mixtures thereof.

The composition of the fluid hydrocarbon feed may vary widely. The fluid hydrocarbon feed may for example contain paraffins, naphthenes, olefins and/or aromatics.

Preferably the fluid hydrocarbon feed comprises in the range from equal to or more than 50 wt %, more preferably from equal to or more than 75 wt %, and most preferably from equal to or more than 90 wt % to equal to or less than 100 wt % of compounds consisting only of carbon and hydrogen, based on the total weight of the fluid hydrocarbon feed.

Preferably the fluid hydrocarbon feed comprises equal to or more than 1 wt % paraffins, more preferably equal to or more than 5 wt % paraffins, and most preferably equal to or more than 10 wt % paraffins, and preferably equal to or less than 100 wt % paraffins, more preferably equal to or less than 90 wt % paraffins, and most preferably equal to or less than 30 wt % paraffins, based on the total fluid hydrocarbon feed. By paraffins both normal-, cyclo- and branched-paraffins are understood.

In a preferred embodiment the fluid hydrocarbon feed comprises or consists of a paraffinic fluid hydrocarbon feed. By a paraffinic fluid hydrocarbon feed is herein understood a fluid hydrocarbon feed comprising at least 50 wt % of paraffins, preferably at least 70 wt % of paraffins, based on the total weight of the fluid hydrocarbon feed. For practical purposes the paraffin content of all fluid hydrocarbon feeds having an initial boiling point of at least 260° C. can be measured by means of ASTM method D2007-03 titled "Standard test method for characteristic groups in rubber extender and processing oils and other petroleum-derived oils by clay-gel absorption chromatographic method", wherein the amount of saturates will be representative for the paraffin content. For all other fluid hydrocarbon feeds the paraffin content of the fluid hydrocarbon feed can be measured by means of comprehensive multi-dimensional gas chromatography (GC×GC), as described in P. J. Schoenmakers, J. L. M. M. Oomen, J. Blomberg, W. Genuit, G. van Velzen, J. Chromatogr. A, 892 (2000) p. 29 and further.

Examples of paraffinic fluid hydrocarbon feeds include so-called Fischer-Tropsch derived hydrocarbon streams such as described in WO2007/090884 and herein incorporated by reference, or a hydrogen rich feed like hydrotreater product or hydrowax. By Hydrowax is understood the bottoms fraction of a hydrocracker. Examples of hydrocracking processes which may yield a bottoms fraction that can be used as fluid hydrocarbon feed, are described in EP-A-699225, EP-A-649896, WO-A-97/18278, EP-A-705321, EP-A-994173 and U.S. Pat. No. 4,851,109 and herein incorporated by reference.

In a preferred embodiment the fluid hydrocarbon feed comprises equal to or more than 8 wt % elemental hydrogen, more preferably more than 12 wt % elemental hydrogen (i.e. hydrogen atoms), based on the total fluid hydrocarbon feed on a dry basis (i.e. water-free basis). A high content of elemental hydrogen, such as a content of equal to or more than 8 wt %, allows the hydrocarbon feed to act as a cheap hydrogen donor in the catalytic cracking process. A particularly preferred fluid hydrocarbon feed having an elemental hydrogen content of equal to or more than 8 wt % is Fischer-Tropsch derived waxy raffinate. Such Fischer-Tropsch derived waxy raffinate may for example comprise about 85 wt % of elemental carbon and 15 wt % of elemental hydrogen.

Without wishing to be bound by any kind of theory it is further believed that a lower weight ratio of fluid hydrocarbon feed to, preferably solid, biomass material results in more bio-carbon on the coked catalytic cracking catalyst.

Preferably the combination of the, preferably solid, biomass material and the fluid hydrocarbon feed has an overall molar ratio of hydrogen to carbon (H/C) of equal to or more than 1.1 to 1 (1.1/1), more preferably of equal to or more than 1.2 to 1 (1.2/1), most preferably of equal to or more than 1.3 to 1 (1.3/1).

In a preferred embodiment an effective molar ratio of hydrogen to carbon ($H/C_{eff}$) is used and the combination of the, preferably solid, biomass material and the fluid hydrocarbon feed preferably has an overall effective molar ratio of hydrogen to carbon ($H/C_{eff}$) of equal to or more than 1.1 to 1 (1.1/1), more preferably of equal to or more than 1.2 to 1 (1.2/1), most preferably of equal to or more than 1.3 to 1 (1.3/1).

If a fluid hydrocarbon feed is present, the weight ratio of the biomass material to fluid hydrocarbon feed may vary widely.

When the biomass material is a solid biomass material, the weight ratio of fluid hydrocarbon feed to solid biomass material is preferably equal to or more than 50 to 50 (5:5), more preferably equal to or more than 70 to 30 (7:3), still more preferably equal to or more than 80 to 20 (8:2), even still more preferably equal to or more than 90 to 10 (9:1). For practical purposes the weight ratio of fluid hydrocarbon feed to solid biomass material is preferably equal to or less than 99.9 to 0.1 (99.9:0.1), more preferably equal to or less than 95 to 5 (95:5). The fluid hydrocarbon feed and the solid biomass material are preferably being fed to the catalytic cracking reactor in a weight ratio within the above ranges.

The amount of solid biomass material, based on the total weight of solid biomass material and fluid hydrocarbon feed supplied to the catalytic cracking reactor, is preferably equal to or less than 30 wt %, more preferably equal to or less than 20 wt %, most preferably equal to or less than 10 wt % and even more preferably equal to or less than 5 wt %. For practical purposes the amount of solid biomass material present, based on the total weight of solid biomass material and fluid hydrocarbon feed supplied to the riser reactor, is preferably equal to or more than 0.1 wt %, more preferably equal to or more than 1 wt %.

When the biomass material comprises a pyrolysis oil, a vegetable oil, liquefied biomass, animal fat or a mixture thereof, the feed supplied to the catalytic cracking reactor preferably comprises in the range from equal to or more than 5 wt %, more preferably equal to or more than 10 wt % to equal to or less than 100 wt %, more preferably equal to or less than 90 wt % of such pyrolysis oil, a vegetable oil, animal fat or a mixture thereof, based on the total weight of the feed.

The catalytic cracking reactor can be any catalytic cracking reactor known in the art to be suitable for the purpose, including for example a fluidized bed reactor or a riser reactor. Most preferably the catalytic cracking reactor is a riser reactor.

Preferably this catalytic cracking reactor is part of a catalytic cracking unit, more preferably of a fluidized catalytic cracking (FCC) unit.

In one embodiment, where the biomass material is a solid biomass material, preferably a suspension of solid biomass material suspended in a fluid hydrocarbon feed is supplied to a riser reactor. Preferences for the fluid hydrocarbon feed are as described herein above.

In another embodiment, where the biomass material is a solid biomass material, the solid biomass material is supplied to the riser reactor at a location downstream of a location where a fluid hydrocarbon feed is supplied to the riser reactor. Without wishing to be bound by any kind of theory it is believed that by allowing the fluid hydrocarbon feed to contact the catalytic cracking catalyst first, cheap hydrogen may be generated. The availability of this cheap hydrogen may assist in the reduction of coke formation when the solid biomass material is contacted with the catalytic cracking catalyst more downstream in the riser reactor.

In another preferred embodiment, where the biomass material is a solid biomass material, the catalytic cracking reactor is a riser reactor and the fluid hydrocarbon feed is supplied to the riser reactor at a location downstream of the location where the solid biomass material is supplied to the riser reactor.

Without wishing to be bound to any kind of theory it is believed that supplying the solid biomass material upstream of the fluid hydrocarbon feed leads to a higher weight percentage of bio-carbon in the carbon-containing deposits on the coked catalytic cracking catalyst. At the location where the fluid hydrocarbon feed is supplied to the riser reactor, the solid biomass material may already be partly or wholly converted into oil, coke and/or cracked products. In a preferred embodiment in the range from equal to or more than 5 wt %, more preferably equal to or more than 10 wt % to equal to or less than 100 wt % of the solid biomass material is converted into oil, coke and/or cracked products at such a location. The cracked products formed are preferably in the gaseous state.

In a still further embodiment, a suspension of solid biomass material suspended in a first fluid hydrocarbon feed is supplied to the riser reactor at a first location and a second fluid hydrocarbon feed is supplied to the riser reactor at a second location downstream of the first location. Preferences for the first and second fluid hydrocarbon feed are as described herein above.

By a riser reactor is herein understood an elongated, preferably essentially tube-shaped, reactor suitable for carrying out catalytic cracking reactions. Suitably a fluidized catalytic cracking catalyst flows in the riser reactor from the upstream end to the downstream end of the reactor. The elongated, preferably essentially tube-shaped, reactor is preferably oriented in an essentially vertical manner. Preferably, the fluidized catalytic cracking catalyst flows from the bottom of the riser reactor upwards to the top of the riser reactor.

Examples of suitable riser reactors are described in the Handbook titled "Fluid Catalytic Cracking technology and operations", by Joseph W. Wilson, published by PennWell Publishing Company (1997), chapter 3, especially pages 101 to 112, herein incorporated by reference.

The riser reactor may be a so-called internal riser reactor or a so-called external riser reactor as described therein.

Most preferably the internal riser reactor is an essentially vertical essentially tube-shaped reactor, that may have an essentially vertical upstream end located outside a vessel and an essentially vertical downstream end located inside the vessel. The vessel is suitably a reaction vessel suitable for catalytic cracking reactions and/or a vessel that comprises one or more cyclone separators and/or swirl tubes. The internal riser reactor is especially advantageous when part of the feed comprises a solid biomass material or a pyrolysis oil. The solid biomass material may be converted into an intermediate oil product. Without wishing to be bound to any kind of theory it is believed that this intermediate oil product or pyrolysis oil may be more prone to polymerization than conventional oils due to oxygen-containing hydrocarbons and/or olefins that may be present in the intermediate oil product. In addition the intermediate oil product or pyrolysis oil may be more corrosive than conventional oils due to oxygen-containing hydrocarbons that may be present. The use of an internal riser reactor allows one to reduce the risk of plugging due to polymerization and/or to reduce the risk of corrosion, thereby increasing safety and hardware integrity.

By an external riser reactor is herein preferably understood a riser reactor that is located outside a vessel. The external riser reactor can suitably be connected via a so-called crossover to a vessel.

When an external riser reactor is used, it may be advantageous to use an external riser reactor with a curve or low velocity zone at its termination as for example illustrated in the Handbook titled "Fluid Catalytic Cracking technology and operations", by Joseph W. Wilson, published by PennWell Publishing Company (1997), chapter 3, figure 3-7, herein incorporated by reference.

It has been advantageously found that a part of the catalytic cracking catalyst may deposit in the curve or low velocity zone, thereby forming a protective layer against corrosion and/or erosion by the catalytic cracking catalyst and any residual solid particles and any oxygen-containing hydrocarbons as explained above.

The length of the riser reactor may vary widely. For practical purposes the riser reactor preferably has a length in the range from equal to or more than 10 meters, more preferably equal to or more than 15 meters and most preferably equal to or more than 20 meters, to equal to or less than 65 meters, more preferably equal to or less than 55 meters and most preferably equal to or less than 45 meters.

In a preferred embodiment the, preferably solid, biomass material is supplied to the riser reactor, at the bottom of this reactor. It may be advantageous to also add a lift gas at the bottom of the riser reactor. Examples of such a liftgas include steam or vaporized naphtha, steam is most preferred as a lift gas. Most preferably the liftgas consists of steam. If the biomass material is supplied at the bottom of the riser reactor, is may optionally be mixed with such a lift gas before entry in the riser reactor, and fed to the reactor as a mixture of biomass material and liftgas. If the biomass material is not mixed with the liftgas prior to entry into the riser reactor it may be fed simultaneously with the liftgas (at one and the same location) to the riser reactor, and optionally mixed upon entry of the riser reactor; or it may be fed separately from any liftgas (at different locations) to the riser reactor.

When both biomass material and steam are introduced into the bottom of the riser reactor, the steam-to-biomass material weight ratio is preferably in the range from equal to or more than 0.01:1, more preferably equal to or more than 0.05:1 to equal to or less than 5:1, more preferably equal to or less than 1.5:1.

When solid biomass material is introduced at the bottom of the riser reactor, it can be advantageous to increase the residence time of the solid biomass material at that part of the riser reactor by increasing the diameter of the riser reactor pipe at the bottom. Hence in a preferred embodiment the catalytic cracking comprises a riser reactor pipe having an enlarged bottom section, for example in the form of a lift pot. Such a liftpot preferably has a diameter larger than the diameter of the riser reactor pipe, more preferably a diameter in the range from equal to or more than 0.4 to equal to or less than 5 meters, most preferably a diameter in the range from equal to or more than 1 to equal to or less than 2 meters. Without wishing to be bound by any kind of theory, such is believed to lead to an increased bio-carbon content in the carbon containing deposits of the coked catalytic cracking catalyst.

Preferably the temperature in the reactor ranges from equal to or more than 450° C., more preferably from equal to or more than 480° C., to equal to or less than 800° C., more preferably equal to or less than 750° C.

Preferably the temperature at the location where the biomass material is supplied to the catalytic cracking reactor lies in the range from equal to or more than 500° C., more preferably equal to or more than 550° C., and most preferably equal to or more than 600° C., to equal to or less than 800° C., more preferably equal to or less than 750° C.

When a solid biomass material is supplied to the catalytic cracking reactor it can be advantageous to supply the solid biomass material to a location in the catalytic cracking reactor where the temperature is slightly higher, for example where the temperature lies in the range from equal to or more than 700° C., more preferably equal to or more than 720° C., even more preferably equal to or more than 732° C. to equal to or less than 800° C., more preferably equal to or less than 750° C. Without wishing to be bound by any kind of theory, such is believed to lead to an increased weight percentage of bio-carbon in the carbon-containing deposits of the coked catalytic cracking catalyst.

Preferably the pressure in the catalytic cracking reactor ranges from equal to or more than 0.5 bar absolute to equal to or less than 10 bar absolute (0.05 MegaPascal-1.0 MegaPascal), more preferably from equal to or more than 1.0 bar absolute to equal to or less than 6 bar absolute (0.1 MegaPascal to 0.6 MegaPascal).

Preferably the total average residence time of the biomass material lies in the range from equal to or more than 1 second, more preferably equal to or more than 1.5 seconds and even more preferably equal to or more than 2 seconds to equal to or less than 10 seconds, preferably equal to or less than 5 seconds and more preferably equal to or less than 4 seconds.

The weight ratio of catalyst to feed (that is the total feed of solid biomass material and, if present, any fluid hydrocarbon feed)—herein also referred to as catalyst: feed ratio—preferably lies in the range from equal to or more than 1:1, more preferably from equal to or more than 2:1 and most preferably from equal to or more than 3:1 to equal to or less than 150:1, more preferably to equal to or less than 100:1, most preferably to equal to or less than 50:1.

The weight ratio of catalyst to biomass material (catalyst: biomass ratio) at the location where the biomass material is supplied to the riser reactor preferably lies in the range from equal to or more than 1:1, more preferably from equal to or more than 2:1 and most preferably from equal to or more than 3:1 to equal to or less than 150:1, more preferably to equal to or less than 100:1, most preferably to equal to or less than 50:1.

When a solid biomass material is supplied to the catalytic cracking reactor it can be advantageous to supply the solid biomass material to a location in the catalytic cracking reactor where the weight ratio of catalyst to solid biomass material (catalyst: solid biomass ratio)is slightly higher, for example in the range from equal to or more than 2:1, more preferably from equal to or more than 3:1 and most preferably from equal to or more than 5:1 to equal to or less than 150:1, more preferably to equal to or less than 100:1. Without wishing to be bound by any kind of theory, such is believed to lead to an increased weight percentage of bio-carbon in the carbon-containing deposits of the coked catalytic cracking catalyst.

In a preferred embodiment the fluid hydrocarbon feed may be introduced to the catalytic cracking reactor at a location where the, preferably solid, biomass material already had a residence time in the range from equal to or more than 0.01 seconds, more preferably from equal to or more than 0.05 seconds, and most preferably from equal to or more than 0.1 seconds to equal to or less than 2 seconds, more preferably to equal to or less than 1 seconds, and most preferably to equal to or less than 0.5 seconds.

In a preferred embodiment the ratio between the residence time for any solid biomass material to the residence time for the fluid hydrocarbon feed (residence solid biomass:residence hydrocarbon ratio) lies in the range from equal to or more than 1.01:1, more preferably from equal to or more than 1.1:1 to equal to or less than 3:1, more preferably to equal to or less than 2:1.

Preferably any solid biomass material is introduced to the riser reactor at a location with temperature T1 and the fluid hydrocarbon feed is introduced to the riser reactor at a location with temperature T2 and temperature T1 is higher than temperature T2. Without wishing to be bound by any kind of theory, such is believed to lead to an increased weight percentage of bio-carbon in the carbon-containing deposits of the coked catalytic cracking catalyst. Preferably both T1 and T2 are equal to or more than 400° C., more preferably equal to or more than 450° C.

The catalytic cracking catalyst can be any catalyst known to the skilled person to be suitable for use in a cracking process. Preferably, the catalytic cracking catalyst comprises a zeolitic component. In addition, the catalytic cracking catalyst can contain an amorphous binder compound and/or a filler. Examples of the amorphous binder component include silica, alumina, titania, zirconia and magnesium oxide, or combinations of two or more of them. Examples of fillers include clays (such as kaolin).

The zeolite is preferably a large pore zeolite. The large pore zeolite includes a zeolite comprising a porous, crystalline aluminosilicate structure having a porous internal cell structure on which the major axis of the pores is in the range of 0.62 nanometer to 0.8 nanometer. The axes of zeolites are depicted in the 'Atlas of Zeolite Structure Types', of W. M. Meier, D. H. Olson, and Ch. Baerlocher, Fourth Revised Edition 1996, Elsevier, ISBN 0-444-10015-6. Examples of such large pore zeolites include FAU or faujasite, preferably synthetic faujasite, for example, zeolite Y or X, ultra-stable zeolite Y (USY), Rare Earth zeolite Y (=REY) and Rare Earth USY (REUSY). According to the present invention USY is preferably used as the large pore zeolite.

The catalytic cracking catalyst can also comprise a medium pore zeolite. The medium pore zeolite that can be used according to the present invention is a zeolite comprising a porous, crystalline aluminosilicate structure having a porous internal cell structure on which the major axis of the pores is in the range of 0.45 nanometer to 0.62 nanometer. Examples of such medium pore zeolites are of the MFI structural type, for example, ZSM-5; the MTW type, for example, ZSM-12; the TON structural type, for example, theta one; and the FER structural type, for example, ferrierite. According to the present invention, ZSM-5 is preferably used as the medium pore zeolite.

According to another embodiment, a blend of large pore and medium pore zeolites may be used. The ratio of the large pore zeolite to the medium pore size zeolite in the cracking catalyst is preferably in the range of 99:1 to 70:30, more preferably in the range of 98:2 to 85:15.

The total amount of the large pore size zeolite and/or medium pore zeolite that is present in the cracking catalyst is preferably in the range of 5 wt % to 40 wt %, more preferably in the range of 10 wt % to 30 wt %, and even more preferably in the range of 10 wt % to 25 wt % relative to the total mass of the catalytic cracking catalyst.

Preferably the catalytic cracking catalyst is contacted in a cocurrent flow configuration with a cocurrent flow of the, preferably solid, biomass material and optionally fluid hydrocarbon feed.

The coked catalytic cracking catalyst produced can be regenerated with the process for regeneration according to the invention.

By contacting the coked catalytic cracking catalyst with an oxygen containing gas in a regenerator at a temperature of equal to or more than 550° C., the carbon-containing deposits, that can be deposited on the catalyst as a result of the catalytic cracking reaction, are burned off to restore the catalyst activity.

During the regeneration of the coked catalytic cracking catalyst, carbon dioxide ($CO_2$) and optionally carbon monoxide (CO) and/or nitrogen oxides (NOx) and/or sulphur oxides (SOx) is produced.

The oxygen containing gas may be any oxygen containing gas known to the skilled person to be suitable for use in a regenerator. For example the oxygen containing gas may be air or oxygen-enriched air. By oxygen enriched air is herein understood air comprising more than 21 vol. % oxygen ($O_2$), more preferably air comprising equal to or more than 22 vol. % oxygen, based on the total volume of air.

In one preferred embodiment the oxygen containing gas comprises equal to or more than 21 vol. % oxygen, more preferably equal to or more than 22 vol. % oxygen, and most preferably equal to or more than 25 vol. % oxygen, based on the total volume of the oxygen-containing gas. For practical purposes the oxygen containing gas may preferably comprise equal to or less than 100 vol. % oxygen, more preferably equal to or less than 50 vol. % oxygen, even more preferably equal to or less than 30 vol. % oxygen, based on the total volume of the oxygen-containing gas.

The use of oxygen-enriched gas, and preferably oxygen-enriched air, is advantageous on its own and therefore the current invention further provides a catalytic cracking process comprising contacting a, preferably solid, biomass material, and optionally a fluid hydrocarbon feed, with a catalytic cracking catalyst at a temperature of more than 400° C. in a catalytic cracking reactor to produce one or more cracked products and a coked catalytic cracking catalyst; contacting the coked catalytic cracking catalyst with an oxygen containing gas in a regenerator to produce a regenerated catalytic cracking catalyst, heat and $CO_2$; wherein the oxygen containing gas comprises more than 21 vol. % oxygen, based on the total volume of oxygen-containing gas.

Preferences for such a process using oxygen-enriched gas are as described herein above and further herein below.

The use of an oxygen-enriched gas, preferably oxygen-enriched air, is especially advantageous when using a biomass material, preferably a solid biomass material, in the feed. Without wishing to be bound by any kind of theory it is believed that the use of especially a solid biomass material in the feed may lead to additional bio-carbon in the carbon-containing deposits on the catalytic cracking catalyst. When using oxygen-enriched gas more bio-carbon can be burned off to advantageously create more "green" heat, thereby reducing fossil $CO_2$ elsewhere in a refinery.

Preferably the coked catalytic cracking catalyst is contacted with the oxygen-containing gas in the regenerator at a temperature in the range from equal to or more than 575° C., more preferably from equal to or more than 600° C., even more preferably from equal to or more than 650° C., to equal to or less than 950° C., more preferably to equal to or less than 850° C.

In an especially preferred embodiment the coked catalytic cracking catalyst is regenerated at a temperature of equal to or more than 700° C., more preferably equal to or more than 720° C., most preferably equal to or more than 732° C. Regenerating the coked catalytic cracking catalyst at a temperature of equal to or more than 700° C. advantageously allows one to ensure that all coke, including any additional coke due to the use of for example a solid biomass material in the feed, is burned off.

This advantageously creates more "green" heat.

In addition it allows one to feed regenerated catalytic cracking catalyst having a temperature of equal to or more than 700° C., more preferably equal to or more than 720° C., most preferably equal to or more than 732° C., to a catalytic cracking reactor. This is especially advantageous when a riser reactor is used, where solid biomass material is supplied to the riser reactor more upstream of the fluid hydrocarbon feed. A catalytic cracking catalyst having a temperature of equal to or more than 700° C. advantageously allows one to convert a majority of the solid biomass material before this is contacted with the fluid hydrocarbon feed.

Alternatively or in addition the excess of heat produced when operating the regenerator at a temperature of equal to or more than 700° C. may conveniently be used to heat water and/or generate medium pressure steam, high pressure steam and/or even very high pressure steam. By medium pressure steam is herein understood steam at a pressure in the range from 10 to 30 bar gauge (0.9 to 2.9 MegaPascal). By high pressure steam is herein understood steam at a pressure in the range from 30 to 70 bar gauge (2.9 to 6.9 MegaPascal). By very high pressure steam is herein understood steam at a pressure in the range from 70 to 100 bar gauge (6.9 to 9.9 MegaPascal). The steam will preferably be superheated steam to avoid condensation thereof at the specified pressure. Such medium pressure steam, high pressure steam and/or very high pressure steam can conveniently be used elsewhere in the refinery, for example as lift gas for the catalytic cracking reactor.

Preferably the coked catalytic cracking catalyst is regenerated at a pressure in the range from equal to or more than 0.5 bar absolute to equal to or less than 10 bar absolute (0.05 MegaPascal to 1.0 MegaPascal), more preferably from equal to or more than 1.0 bar absolute to equal to or less than 6 bar absolute (0.1 MegaPascal to 0.6 MegaPascal).

The regenerator may have any design known by the person skilled in the art to be suitable for regeneration of a coked catalytic cracking catalyst. For example the regenerator may be designed as described in the Handbook titled "Fluid Catalytic Cracking technology and operations", by Joseph W. Wilson, published by PennWell Publishing Company (1997), chapter 4, especially pages 131 to 155, herein incorporated by reference.

The regenerator may comprise one stage or, if desired, two or more stages.

Preferably the regenerator comprises a dense phase catalyst bed topped by a dilute phase catalyst bed and preferably one or more cyclones to collect entrained catalyst particles and return them to the dense phase.

In addition the regenerator may contain one or more catalyst coolers, preferably so-called dense phase catalyst coolers such as for example depicted in figures 4-17, 4-18a and 4-18b of the above Handbook by Joseph W. Wilson. These dense phase catalyst coolers comprise one or more bayonet shaped tubes arranged in one or more rings in the regenerator. The catalytic cracking catalyst is preferably fluidized by the oxygen-containing gas and flows on the shell side of the cooler. Water is fed into the bayonet shaped tubes and at least partly converted into steam.

The use of regenerators comprising one or more catalyst coolers is especially preferred when a solid biomass material is used in the feed, causing additional coking of the catalytic cracking catalyst. In addition the use of regenerators comprising one or more catalyst coolers is especially preferred when operating the regenerator at a temperature of equal to or more than 700° C.

During regeneration of the coked catalytic cracking catalyst, a regenerated catalytic cracking catalyst, carbon dioxide and heat are produced.

The heat generated in the exothermic regeneration is preferably employed to provide energy for an endothermic catalytic cracking step. In a preferred embodiment, the process according to the invention advantageously allows for a sufficient amount of coke deposited on the catalytic cracking catalyst such that the endothermic catalytic cracking step can be carried out without supplying additional heat.

In addition part of the heat generated in the exothermic regeneration step may be employed to heat water and/or produce for example medium pressure steam, high pressure steam and/or very high pressure steam as described herein above.

Catalytic cracking of a biomass material with a catalytic cracking catalyst to produce a coked catalytic cracking catalyst and regeneration of the coked catalytic cracking catalyst as described herein is preferably carried out in a catalytic cracking unit. This catalytic cracking unit preferably comprises at least a catalytic cracking reactor and a regenerator as described herein above.

In a preferred embodiment the coked catalytic cracking catalyst is produced in a catalytic cracking process comprising:

a catalytic cracking step comprising contacting the, preferably solid, biomass material and optionally a fluid hydrocarbon feed with the catalytic cracking catalyst at a temperature of more than 400° C. in a catalytic cracking reactor and catalytically cracking the solid, biomass material and optional fluid hydrocarbon feed to produce one or more cracked products and a coked catalytic cracking catalyst;

a separation step comprising separating the one or more cracked products from the coked catalytic cracking catalyst;

a regeneration step comprising regenerating coked catalytic cracking catalyst to produce a regenerated catalytic cracking catalyst, heat and carbon dioxide; and a recycle step comprising recycling the regenerated catalytic cracking catalyst to the catalytic cracking step.

In such a process the total feed of the biomass material and any fluid hydrocarbon feed preferably has a bio-carbon weight percentage $B1$, based on the total weight of carbon in the total feed, and the coked catalytic cracking catalyst preferably comprises carbon-containing deposits having a bio-carbon weight percentage $B2$, based on the total weight of carbon in the carbon-containing deposits; and the bio-carbon weight percentage $B2$ is preferably higher than the bio-carbon weight percentage $B1$.

The catalytic cracking step is preferably carried out as described herein before.

The separation step is preferably carried out with the help of one or more cyclone separators and/or one or more swirl tubes. Suitable ways of carrying out the separation step are for example described in the Handbook titled "Fluid Catalytic Cracking; Design, Operation, and Troubleshooting of FCC Facilities" by Reza Sadeghbeigi, published by Gulf Publishing Company, Houston Tex. (1995), especially pages 219-223. The cyclone separators are preferably operated at a velocity in the range from 18 to 80 meters/second, more preferably at a velocity in the range from 25 to 55 meters/second.

In addition the separation step may further comprise a stripping step. In such a stripping step the coked catalyst may be stripped to recover the products absorbed on the coked catalyst before the regeneration step. These products may be recycled and added to the cracked product stream obtained from the catalytic cracking step.

The regeneration step preferably comprises contacting of the coked catalytic cracking catalyst with an oxygen containing gas in a regenerator as described herein before.

The regenerated catalytic cracking catalyst can be recycled to the catalytic cracking step. In a preferred embodiment a side stream of make-up catalyst is added to the recycle stream to make-up for loss of catalyst in the reaction zone and regenerator.

When catalytically cracking the biomass material and optionally the fluid hydrocarbon feed one or more cracked products are produced. In a preferred embodiment this/these one or more cracked products is/are subsequently fractionated to produce one or more product fractions.

The one or more cracked products may contain one or more oxygen-containing-hydrocarbons. Examples of such oxygen-containing-hydrocarbons include ethers, esters, ketones, acids and alcohols. In specific the one or more cracked products may contain phenols.

Fractionation may be carried out in any manner known to the skilled person in the art to be suitable for fractionation of products from a catalytic cracking unit. For example the fractionation may be carried out as described in the Handbook titled "Fluid Catalytic Cracking technology and operations", by Joseph W. Wilson, published by PennWell Publishing Company (1997), chapter 8, especially pages 223 to 235, herein incorporated by reference.

In a further embodiment at least one of the one or more product fractions obtained by fractionation are subsequently hydrodeoxygenated to produce a hydrodeoxygenated product fraction. This/these hydrodeoxygenated product fraction(s) may be used as biofuel and/or biochemical component(s).

The one or more product fractions may contain one or more oxygen-containing-hydrocarbons. Examples of such oxygen-containing-hydrocarbons include ethers, esters, ketones, acids and alcohols. In specific one or more product fractions may contain phenols and/or substituted phenols.

By hydrodeoxygenation is herein understood reducing the concentration of oxygen-containing hydrocarbons in one or more product fraction(s) containing oxygen-containing hydrocarbons by contacting the one or more product fraction(s) with hydrogen in the presence of a hydrodeoxygenation catalyst. Oxygen-containing hydrocarbons that can be removed include acids, ethers, esters, ketones, aldehydes, alcohols (such as phenols) and other oxygen-containing compounds.

The hydrodeoxygenation preferably comprises contacting of the one or more product fractions with hydrogen in the presence of an hydrodeoxygenation catalyst at a temperature in the range from equal to or more than 200° C., preferably equal to or more than 250° C., to equal to or less than 450° C., preferably equal to or less than 400° C.; at a total pressure in the range of equal to or more than 10 bar absolute to equal to or less than 350 bar absolute (1.0 to 35 MegaPascal); and at a partial hydrogen pressure in the range of equal to or more than 2 bar absolute to equal to or less than 350 bar absolute (0.2 to 35 MegaPascal).

The hydrodeoxygenation catalyst can be any type of hydrodeoxygenation catalyst known by the person skilled in the art to be suitable for this purpose.

The hydrodeoxygenation catalyst preferably comprises one or more hydrodeoxygenation metal(s), preferably supported on a catalyst support. The catalyst support is preferably inert as a hydrodeoxygenation catalyst at the hydrodeoxygenation conditions.

The one or more hydrodeoxygenation metal(s) are preferably chosen from Group VIII and/or Group VIB of the Periodic Table of Elements. The hydrodeoxygenation metal may for example be present as a mixture, alloy or organometallic compound.

Preferably the one or more hydrodeoxygenation metal(s) is chosen from the group consisting of Nickel (Ni), Chromium (Cr), Molybdenum (Mo), Tungsten (W), Cobalt (Co), Platinum (Pt), Palladium (Pd), Rhodium (Rh), Ruthenium (Ru), Iridium (Ir), Osmium (Os), Copper (Cu), Iron (Fe), Zinc (Zn), Gallium (Ga), Indium (In), Vanadium (V) and mixtures thereof. The one or more metal(s) may be present in elementary form; in the form of alloys or mixtures; and/or in the form of oxides, sulfides or other metal-organic compounds.

If the hydrodeoxygenation catalyst comprises a catalyst support, the catalyst support may comprise a refractory oxide or mixtures thereof, preferably alumina, amorphous silica-alumina, titania, silica, ceria, zirconia; or it may comprise an inert component such as carbon or silicon carbide. The catalyst support may further comprise a zeolitic compound such as for example zeolite Y, zeolite beta, ZSM-5, ZSM-12, ZSM-22, ZSM-23, ZSM-48, SAPO-11, SAPO-41, and ferrierite.

Most preferred are hydrodeoxygenation catalysts comprising Rhodium on alumina($Rh/Al_2O_3$), Rhodium-Cobalt on alumina ($RhCo/Al_2O_3$), Nickel-Copper on alumina($NiCu/Al_2O_3$), Nickel-Tungsten on alumina ($NiW/Al_2O_3$), Cobalt-Molybdenum on alumina($CoMo/Al_2O_3$) or Nickel-Molybdenum on alumina ($NiMo/Al_2O_3$).

If the one or more product fractions also contain one or more sulphur-containing hydrocarbons it may be advantageous to use a sulphided hydrodeoxygenation catalyst. If the hydrodeoxygenation catalyst is sulphided the catalyst may be sulphided in-situ or ex-situ. Such in-situ or ex-situ sulphiding can be carried out in any manner known by the skilled person to be suitable for in-situ or ex-situ sulphiding. In the case of in-situ sulphiding, a sulfur source, usually hydrogen sulphide or a hydrogen sulphide precursor, is preferably supplied to the hydrodeoxygenation catalyst before operation of the process in a hydrodeoxygenation reactor. In addition it may be advantageous to add a small amount of hydrogen sulphide during operation of the hydrodeoxygenation process to keep the catalyst sufficiently sulphided.

In addition to the hydrodeoxygenation, the one or more product fractions may be subjected to hydrodesulphurization, hydrodenitrogenation, hydrocracking and/or hydroisomerization. Hydrodesulphurization may reduce the concentration of any sulphur-containing hydrocarbons. Hydrodenitrogenation may reduce the concentration of any nitrogen-containing hydrocarbons. Hydroisomerization may increase the concentration of branched hydrocarbons. Hydrocracking may further crack the product in smaller compounds.

Such hydrodesulphurization, hydrodenitrogenation, hydrocracking and/or hydroisomerization may be carried out before, after and/or simultaneously with the hydrodeoxygenation.

In a preferred embodiment the one or more hydrodeoxygenated product(s) produced in the hydrodeoxygenation can be blended with one or more other components to produce a biofuel and/or a biochemical. Examples of one or more other components with which the one or more hydrodeoxygenated product(s) may be blended include anti-oxidants, corrosion inhibitors, ashless detergents, dehazers, dyes, lubricity improvers and/or mineral fuel components.

Alternatively the one or more hydrodeoxygenated product(s) can be used in the preparation of a biofuel component and/or a biochemical component. In such a case the biofuel component and/or biochemical component prepared from the one or more hydrodeoxygenated product may be subsequently blended with one or more other components (as listed above) to prepare a biofuel and/or a biochemical.

By a biofuel respectively a biochemical is herein understood a fuel or a chemical that is at least party derived from a renewable energy source.

What is claimed is:

1. A process for regenerating a coked catalytic cracking catalyst, comprising contacting the coked catalytic cracking catalyst with an oxygen containing gas at a temperature of equal to or more than 550° C. in a regenerator to produce a regenerated catalytic cracking catalyst, heat and carbon dioxide, wherein the coked catalytic cracking catalyst comprises carbon-containing deposits, which carbon-containing deposits comprise 1 wt% to 25 wt% bio-carbon, based on the total weight of carbon present in the carbon-containing deposits, wherein the coked catalytic cracking catalyst is produced by contacting a solid biomass material with a catalytic cracking catalyst at a temperature of more than 400° C. in a catalytic cracking reactor.

2. The process of claim 1 wherein the oxygen-containing gas comprises more than 21 vol. % oxygen, based on the total volume of the oxygen-containing gas.

3. The process of claim 1 wherein the coked catalytic cracking catalyst is produced by contacting the biomass material and a fluid hydrocarbon feed with a catalytic cracking catalyst at a temperature of equal to or more than 400° C. in a catalytic cracking reactor, wherein the catalytic cracking reactor is a riser reactor and the biomass material is supplied to the riser reactor upstream of the fluid hydrocarbon feed.

4. The process of claim 3 wherein the biomass material is a solid biomass material.

5. The process of claim 1 wherein the coked catalytic cracking catalyst is contacted with the oxygen containing gas in the regenerator at a temperature of equal to or more than 700° C.

6. The process of claim 1 wherein part of the produced heat is subsequently used to heat water and/or generate pressurized steam.

\* \* \* \* \*